United States Patent [19]

Dressen et al.

[11] 4,019,186
[45] Apr. 19, 1977

[54] MOTION PICK-UP APPARATUS IN A NON-MECHANICAL PRINTER

[75] Inventors: Anton Dressen, Dachau; Klaus Menzel, Ebersberg, both of Germany

[73] Assignee: Siemens Aktiengesellschaft, Berlin & Munich, Germany

[22] Filed: Mar. 18, 1976

[21] Appl. No.: 668,125

[30] Foreign Application Priority Data

Mar. 20, 1975 Germany .................... 2512349

[52] U.S. Cl. .................... 346/108; 346/76 L; 250/227
[51] Int. Cl.² .................. G01D 9/42; G01D 15/10; G02B 5/14
[58] Field of Search ........... 346/76 L, 108; 250/227

[56] References Cited
UNITED STATES PATENTS

| | | |
|---|---|---|
| 3,389,403 | 6/1968 | Cottingham et al. ............. 346/108 |
| 3,713,721 | 1/1973 | Watson ....................... 346/108 UX |
| 3,727,062 | 4/1973 | Foster ........................ 346/108 UX |
| 3,751,587 | 8/1973 | Insler et al. ............... 346/76 L UX |
| 3,820,123 | 6/1974 | Ammann ..................... 346/108 UX |

*Primary Examiner*—George H. Miller, Jr.
*Attorney, Agent, or Firm*—Hill, Gross, Simpson, Van Santen, Steadman, Chiara & Simpson

[57] ABSTRACT

A motion pick-up in a non-mechanical printer to produce electric timing signals at instances of time at which given points of a path of motion are crossed includes a light transmissive rod arranged along the path of motion which is parallel to the line of print on a data carrier. The light transmissive rod has marks thereon, or associated therewith at the level of the given points and a laser beam which is split into sub-beams by an acousto-optical beam deflector provides a predetermined sub-beam which is deflected by a polygonal reflector and scanned thereby along the rod. The sub-beam is influenced by the marks in such a manner so as to cause light scattering and reflection through the rod so as to strike a photo-element and produce output signals which constitute electric timing signals. The rod may be glass or a synthetic material. The marks may be constituted by scratches on the rod.

5 Claims, 3 Drawing Figures

MOTION PICK-UP APPARATUS IN A NON-MECHANICAL PRINTER

BACKGROUND OF THE INVENTION

1. Field of the Invention

This invention relates to a motion pick-up for the production of electric timing signals at instances of time at which given points of a path of motion are crossed, and more particularly to such a pick-up in which the path of motion is crossed by a light beam in a non-mechanical printing system.

2. Description of the Prior Art

Motion pick-ups are required in many applications. An example of such an application is a non-mechanical printer, in which, for example, with the aid of a light beam, a charge image of the character which is to be printed is produced on a photoconductor drum. This character is developed and is then transferred to a web of paper in a transfer station, and is fixed upon the paper web. Generally, the charge images of a plurality of characters are produced next to one another in a line extending along the surface of a photo conductor drum parallel to the axis of rotation of the drum. To this end, the light beam must be deflected in the axial direction of the photo-conductor drum. Then, however, a character pulse train is required which indicates when the light beam must produce a charge image of a character on the photo conductor drum. That is to say, that whenever a character pulse occurs, the light beam is switched on and is conducted to the appropriate point of the photo-conductor drum.

SUMMARY OF THE INVENTION

The object of the present invention is to provide a motion pick-up which is of simple construction and which is particularly expedient when a light beam is already available for other purposes.

This object is realized through the provision of a light transmissive rod extending along the path of motion of the light beam, that is along the scanning direction of the beam, which rod carries or has associated therewith marks at the level of given points along the scanning path so that a light beam moving along the light transmissive rod is influenced by the marks in such a manner that it strikes a photo-element whose output signals constitute timing signals.

Thus, along the path of motion is arranged a light transmissive rod which possesses a mark whenever the predetermined points of the path of motion occur. The light transmissive rod can be in the form of a glass rod, although it can also be produced from a light transmissive synthetic material.

A light beam is conducted along the light transmissive rod. Whenever a light beam strikes a mark on the rod, it is scattered and as a result of total reflection is forwarded inside the rod.

If a photo-element is arranged at one end of the rod, the reflected light strikes the photo element and causes the latter to emit a signal. At the points at which there are no marks on the rod the light can pass through the rod.

It is particularly advantageous if the motion pick-up is employed in an arrangement in which a light beam is already provided for a different purpose. In this case, a sub-beam can be branched off from the light beam and can be conducted along the rod, and consequently, the outlay for the motion pick-up is very low.

Other further developments of the invention are discussed in detail below in the Description of the Preferred Embodimdents in conjunction with the drawings.

BRIEF DESCRIPTION OF THE DRAWINGS

Other objects, features and advantages of the invention, its organization, construction and operation will be best understood from the following description taken in conjunction with the accompanying drawings, on which.

DESCRIPTION OF THE PREFERRED EMBODIMENTS

Figure 1:
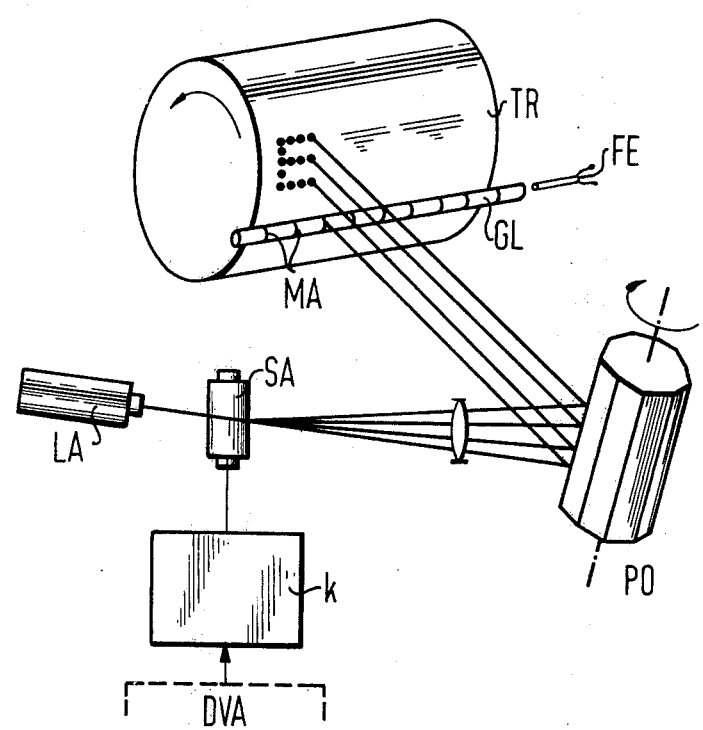
FIG. 1 is a schematic representation of a non-mechanical printer which employs the present invention.

FIG. 1 is a schematic representation of a non-mechanical printer, in which charge images of the characters to be printed are produced on a photo conductor drum TR. Non-mechanical printers of this type are known in the art, for example from Steinbuch, "Taschenbuch der Nachrichtenverarbeitung," 1967, Page 695. In a printer of this type, a light beam is produced by a light source LA, e.g. a laser. This light beam is conducted to an acousto-optical beam deflector SA. Acousto-optical beam deflectors of this type are also well known in the art. The acousto-optical beam deflector SA splits the beam emanating from the light source LA into a series of sub-beams which are arranged vertically one above another and which are themselves commonly deflected in the horizontal direction by a polygonal reflector PO. The acousto-optical beam deflector SA produces precisely as many sub-beams as sound waves of different frequencies with which it has been fed. Also, a part of the light emerges again from the acousto-optical beam deflector SA undeflected (so-called zeroth beam). The sound waves required for the light deflection are produced in a known manner by a piezoelectric transducer from electronic frequencies emanating from switching oscillators. The oscillators are arranged, for example, in the drive electronics $k$. The drive electronics $k$ can be connected to a data processing system DVA in the usual manner.

The light beam is thus conducted from a polygonal reflector PO onto a photo-conductor drum TR, upon which a charge image of the character to be printed is formed. This character is, for example, an E. If an entire line of characters is to be printed one next to one another, the light beam is deflected in an appropriate fashion in the axial direction by the polygonal reflector PO. Whenever the charge image of a character which is to be printed is to be produced, the oscillators in the drive electronics $k$ are switched on, and the sub-beams formed in the acousto-optical beam deflector SA are conducted from the polygonal reflector PO to the photo-conductor drum TR.

However, this method of representing characters requires a timing signal with the aid of which it is possible to determine the times at which the oscillators must be switched on. In particular, it must be ensured that the characters to be printed on the recording surface follow one another at uniform intervals along a line. Timing pulses of this type can be produced with the motion pick-up device of the present invention. To this end, a light transmissive rod GL is arranged in parallel to the line to be printed on the photo-conductor drum TR. Then, a sub-beam of the light beam emanating from the acousto-optical light deflector SA can be used to scan the rod GL. This can expediently be the non-deflected beam--thus the zeroth beam.

A plurality of marks MA are arranged on the rod GL, and in fact in such a manner that a mark MA is present at the point at which the charge image of a character is to be produced. The distance between the marks corresponds, in the case of a printer, to the distance between the characters which are to be printed.

A photo-electric element FE is arranged at least at one end of the rod GL. If light strikes this photo-electric element FE, it emits a signal which is amplified and can then be used as a timing signal.

Thus, if one line of character is to be printed, then for example the zeroth beam from the polygonal reflector PO is conducted along the rod GL, that is scanned along the rod. Whenever the zeroth beam strikes a mark MA, the light is scattered and as a result of total reflection is forwarded inside the rod GL to the photo-electric element FE. The photo-electric element FE produces a signal which, have been amplified, is used as a timing signal. This timing signal is fed in a known manner to the drive electronics $k$ in which the oscillators are switched on accordingly and the emitted frequencies are transformed into sound waves by a piezoelectric transducer. The sound waves pass through the acousto-optical beam deflector SA which divides the beam emanating from the light source LA into sub-beams which are conducted to the photo-conductor drum TR.

The marks MA on the rod GL can, for example, be in the form of scratch marks which are arranged in the desired spacing, e.g. in the case of a printer, the spacing between the characters and which are contrived to be such that a beam passes over them. At the scratch marks the light beam is scattered and is forwarded to the ends of the rod GL as a result of the light conducting effect of the latter. When the light beam strikes parts of the rod GL the surfaces of which do not exhibit scratch marks, no scattering of light occurs, and consequently there is no light intensity at the ends of the rod, which would cause the photoelectric element FE to emit a signal. The scratch marks are advantageously arranged on the rear side of the rod, with respect to the scanning beam. The signal scatter ratio can be improved by lining the scratch marks with conductive silver.

In order to improve the light/dark ratio, the rod can be provided with a layer which is impermeable to light and which exhibits crack-like openings. The layer which is impermeable to light can consist of a highly reflective metal vapor deposition on the rod, or can consist of a lacquer which is impermeable to light and which does not prevent the total reflection of the light on the glass wall. In this case, the openings in the layer which is impermeable to light will then constitute the marks MA. In such a design, no scratch marks are necessary, and it is in fact sufficient to design the rod as a continuous scatter surface.

The covering for the rod GL can also be formed by a diaphragm which is arranged in front of the rod and which is provided with gap-like openings.

Another possibility of designing the motion pick-up resides in reversing the scatter-transmission ratio. In this case, it must be provided that at the points at which timing pulses are to be produced, the light beam can pass unobstructed through the rod. Then, by means of an appropriate design of the rear side, the other regions of the glass rod must then scatter as great as possible a proportion of the light beam in the direction toward the rod ends. In this case, the front and the rear of the rod can consists of rough and smooth zones.

By means of an appropriate selection of the light-admitting zones and the light-scattering zones which are impervious to light on the rod, it is possible to form any keying ratio of the light intensity and to obtain corresponding signals from the photo-electric element FE.

Figure 2:
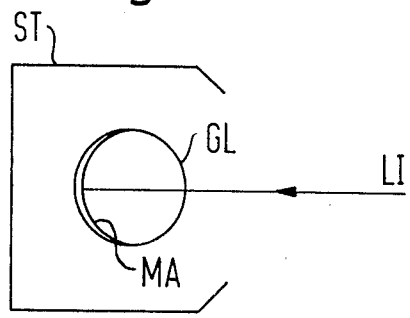
FIG. 2 is a sectional view taken through a part of the motion pick-up of the present invention.

The rod GL is preferably installed in a black box ST which only one entry opening for the light beam, in order to avoid scattered light resulting from reflections of the light beam in the vicinity. This is illustrated in FIG. 2. Here, a rod GL is arranged in a black box ST. It can also be seen that on the rear of the rod Gl are arranged the marks MA, e.g. a scratch mark. A light beam LI is illustrated as striking the rod GL.

It is possible to arrange a plurality of rods in which the marks exhibit different graduations on a revolver device so that it is possible to use various spacings between the marks.

With the aid of the motion pick-up it is thus possible to produce timing signals which are all the more accurately defined the finer the marks are, and the better the light beam is focused in the plane of the marks. The timing signals are employed, for example, as the starting times for the scanning of an electronic character memory with a pulse train, and for the corresponding switching of the oscillators for the sound production in the case of a non-mechanical printer. Then, in the simplest situation, the intervals between the characters will be equal to the intervals between the marks. However, by electronic graduation it is also possible to produce different, narrower or wider spacing between the characters than between the marks.

The rod GL can be produced as round material. It can consist of glass or, as mentioned above, of a light transmissive synthetic material.

Figure 3:
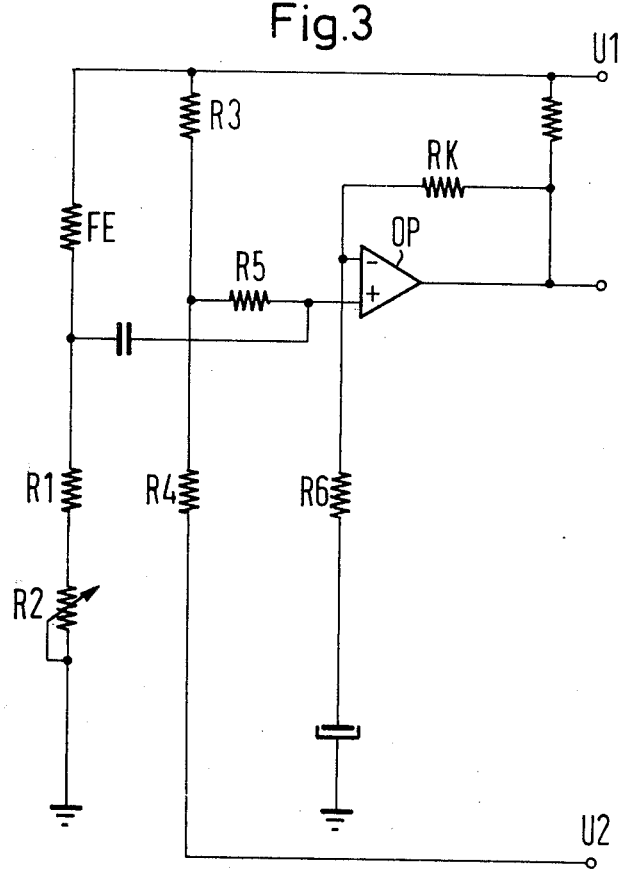
FIG. 3 is a schematic circuit diagram of an amplifier which includes a photo-electric element for producing timing signals.

FIG. 3 illustrates a fundamental circuit diagram of a timing signal amplifier. The photo-electric element FE is located in a resistance bridge which comprises a plurality of resistors R1, R2, R3, R4 and R5. The signal produced in the resistance bridge is conducted to an operation amplifier OP. The other input of the operation amplifier is connected by way of a resistor R6 to an operating voltage (OV) and is connected by way of a feedback resistor RK to the output. The amplified timing signal is obtained from the output of the operational amplifier OP. The terminals U1 and U2 represent additonal operating voltages.

The motion pick-up constructed in accordance with the invention is of very simple construction and is highly reliable. As it directly establishes the position of the light beam, it is extremely precise. Thus, for example, in the case of a nonmechanical printer, the position of the beam in the recording plane is scanned. Consequently, no correcting elements are required to convert the arc to the tangent. The use of the so-called zeroth beam in an acousto-optical beam deflector enables a precise location of the group of deflected sub-beams. This obviates the necessity to employ auxiliary light sources to enable correspondingly fine adjustement in order to set up the phase state. If a laser is used as the light source, advantageously the laser light can be focused in an optimum fashion, and consequently the highest possible degree of pulse train accuracy can be achieved.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Motion pick-up apparatus for producing electronic timing signals in a non-mechanical character printer, comprising:
   a light source operable to produce a laser beam;
   beam deflection apparatus including an acousto-optical beam deflector for splitting the laser beam into a plurality of sub-beams in accordance with each of the characters to be pritned;
   a data carrier;
   a polygonal reflector for deflecting the sub-beams onto the data carrier at spaced locations for each character along a line of the data carrier;
   a light transmissive rod disposed parallel to the line of print of the data carrier;
   light scattering locations along said rod in the path of a predetermined sub-beam for scattering incident light for transmission through said rod; and
   a light detector at one end of said rod for generating timing signals in response to the light reflected through said rod.

2. The apparatus of claim 1, wherein the distance between said light scattering locations is equal to the distance between the characters as they are printed on the data carrier.

3. The apparatus of claim 1, wherein the distance between said light scattering locations is a fraction of the distance between the characters as they are printed on the data carrier.

4. The apparatus of claim 1, wherein the distance between said light scattering locations is a multiple of the distance between the characters as they are printed on the data carrier.

5. The motion pick-up of claim 1, comprising a black box housing said rod, including a slot for receiving the light beam.

* * * * *